United States Patent

Duffin et al.

(10) Patent No.: US 12,144,294 B2
(45) Date of Patent: Nov. 19, 2024

(54) IRRIGATION SADDLE, ADAPTER, AND CAP

(71) Applicants: Don D. Duffin, Paul, ID (US); Roger M. Duffin, Paul, ID (US)

(72) Inventors: Don D. Duffin, Paul, ID (US); Roger M. Duffin, Paul, ID (US)

( * ) Notice: Subject to any disclaimer, the term of this patent is extended or adjusted under 35 U.S.C. 154(b) by 503 days.

(21) Appl. No.: 15/925,622

(22) Filed: Mar. 19, 2018

(65) Prior Publication Data

US 2018/0263199 A1    Sep. 20, 2018

Related U.S. Application Data

(60) Provisional application No. 62/472,698, filed on Mar. 17, 2017.

(51) Int. Cl.
*A01G 25/02* (2006.01)
*F16L 41/02* (2006.01)
*F16L 47/34* (2006.01)

(52) U.S. Cl.
CPC .......... *A01G 25/023* (2013.01); *F16L 41/021* (2013.01); *F16L 47/345* (2013.01)

(58) Field of Classification Search
CPC ....... F16L 41/02; F16L 41/021; F16L 47/345; F16L 19/06; F16L 19/061; F16L 19/065; F16L 19/0653; F16L 19/07; F16L 21/03; F16L 21/035; F16L 21/05; F16L 21/02; F16L 17/02; F16L 17/06; F16L 17/00; F16L 17/067

USPC ................ 285/133.11, 133.21, 133.3, 133.4; 239/200, 288

See application file for complete search history.

(56) References Cited

U.S. PATENT DOCUMENTS

| 2,376,412 | A | * | 5/1945 | Arthur ................ F24D 19/0004 237/59 |
| 5,868,443 | A |   | 2/1999 | Ungerman et al. |
| 6,302,445 | B1 |  | 10/2001 | Kungele et al. |
| 6,357,802 | B1 | * | 3/2002 | Nozato ................. F16L 37/091 264/269 |
| D673,244 | S |   | 12/2012 | Magargal et al. |
| 8,459,698 | B2 |  | 6/2013 | Margargal et al. |
| 2006/0065306 | A1 | * | 3/2006 | Mortensen ............ F16L 47/345 137/318 |
| 2012/0161433 | A1 | * | 6/2012 | Magargal ................ F16L 47/28 239/200 |
| 2013/0181445 | A1 | * | 7/2013 | Glime ................... F16L 19/061 285/337 |

* cited by examiner

*Primary Examiner* — Aaron M Dunwoody

(74) *Attorney, Agent, or Firm* — Scott Swanson; Shaver Swanson

(57) ABSTRACT

What are disclosed are embodiments of a saddle, cap, and adapter for use in an irrigation system. In a preferred embodiment, the disclosed inventive concepts utilize a dynamic seal that provides an improvement over prior known technology. In a preferred embodiment the adapter and cap are made to be removable so as to be easily changed or replaced.

4 Claims, 7 Drawing Sheets

IRRIGATION SADDLE, ADAPTER, AND CAP

SUMMARY OF THE INVENTION

Figure 1:
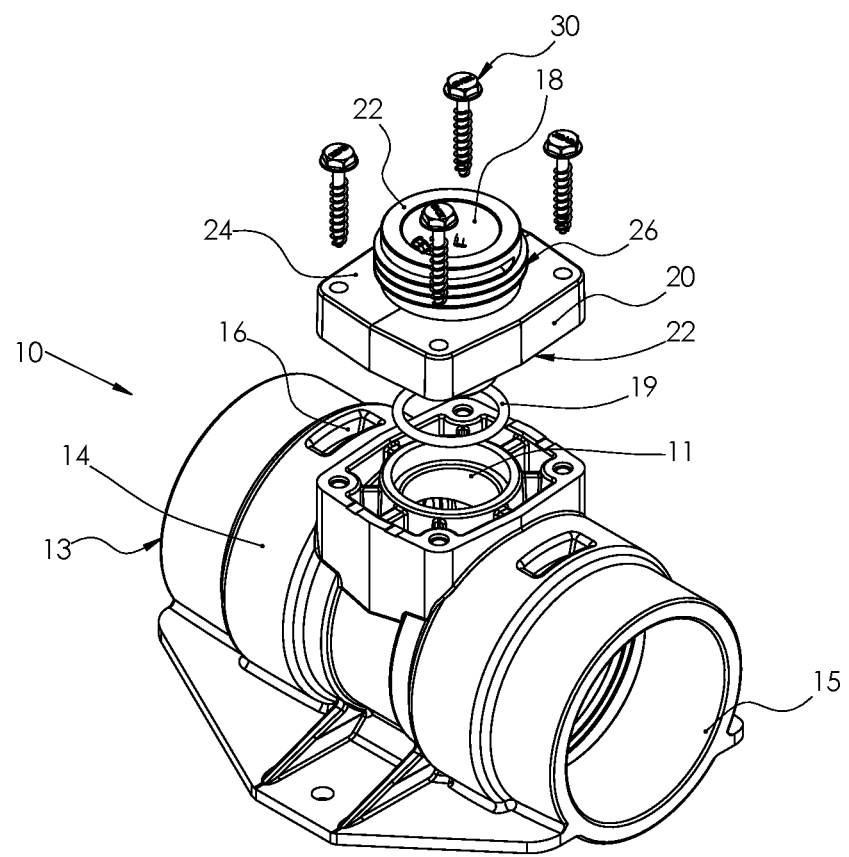

The purpose of the Summary of the Invention is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

What is disclosed is an irrigation connector, such as a tee or coupler, used to support a sprinkler riser and sprinkler. The connector is cylindrical and tube-like in structure and has one or more open ends to which can be connected irrigation pipe. The connector also includes a flange to which is attached removable saddle designed to provide a mount for a sprinkler accessory, such as a cap and/or sprinkler riser.

The saddle is designed to support a sprinkler riser and sprinkler for irrigation. In general practice, the sprinkler riser is typically connected to the saddle by first connecting the bottom of the riser to the upper portion of a cap by glue or some other means, forming a cap and riser assembly. The cap and riser assembly is attached to the saddle by threading the bottom portion of the cap onto a threaded mount extending away from the irrigation connector in a roughly perpendicular orientation with respect to the ground. The mount is positioned above an aperture in the connector such that water may flow from the irrigation pipe, into the connector, through the saddle, and then through the cap and riser assembly, ultimately exiting via a sprinkler head. In this configuration the connector and saddle are typically constructed as a single unit and are commonly constructed of plastic. The plastic construction often does not withstand the forces and vibrations generated by impact sprinklers. In addition, the single piece connector and saddle construction is generally designed only for use with a particular irrigation accessory, such as the compatible threaded cap, and generally does not allow for alternative accessories and/or different methods of attachment.

Embodiments disclosed herein overcome these general limitations by replacing the common integrated threaded mount with a generally flat interface, herein called a flange, to which various saddles and adapters can be attached.

In most embodiments, each tee will define a port in fluid communication with the interior of the removable saddle via the aperture. In an alternative embodiment, the removable saddle may lack any mount or port and, upon installation, would serve to block off the saddle aperture and prevent the flow of any fluid through the aperture. While the irrigation connector may be constructed of one material, such as plastic, each saddle may be constructed of a different material, such as plastic or metal. This allows a user to construct a connector/saddle combination that best suits their needs, i.e. a combination that can better withstand the forces inherent with impact sprinklers. Also, different adapters may be used to accommodate different irrigation accessories entirely, and may be configured and substituted as needed.

In an example embodiment, one saddle has a circular shaped tube upon which to attach an accessory. The circular shaped mount may contain female-type threads be configured to accommodate the common male-type circular threaded accessory, such as a sprinkler riser. A second adapter may contain a male-type mount for attachment of a female-type sprinkler accessory, such as a cap. Regardless of the adapter's construction or configuration, each adapter is designed to attach to the irrigation tee in a universal way through the use of connectors, such as screws. A gasket may be used between the flange of the irrigation tee and the saddle to prevent water leakage.

In a further embodiment, a circular mount having threading on both the exterior and interior of the saddle (i.e. both male and female-type threading) may be used. This combination of threading options allows to allow the attachment of either an internally threaded fixture, such as a strengthening collar, a riser support, stabilizer feet, or some other option, or an externally threaded fixture, such as a riser itself. While this saddle may be included as part of an adapter to be attached to a saddle flange, the benefits of using this dual threaded mount are present when the saddle is integrated into an irrigation connector such as an irrigation tee as a single piece (i.e. not as a removable saddle).

Also disclosed is a plug containing a main body that is cylindrical in shape and hollow. The base of the plug contains external circumferential threading capable of being threaded into the internal threading of the circular tube of the saddle. A seal may also be used between the circular mount and the plug to prevent water leakage during use. In a preferred embodiment, the plug contains a dedicated circumferential channel on the exterior of the base above the external threading. A dynamic O-ring is positioned within the channel. The O-ring is of sufficient thickness such that a water tight seal results even when the plug is not tightly installed in a compatible saddle or other fixture. The pressure of the water in an irrigation system presses the O-ring into a seal preventing from water escaping. This design also results in an integrated sealing device that is not at risk of being dislodged or lost when the plug is removed from the saddle or fixture. In contrast, in a mechanical seal if the cap or plug is not installed correctly and/or becomes loose it may leak.

The opposite end of the plug's cylindrical body has a smooth interior into which can be attached a sprinkler riser using recognized methods, such as welding with PVC solvent. Alternatively, the interior of the upper portion of the plug may contain internal threading to which may be attached an externally threaded riser or some other sprinkler accessory. Exteriorly, the plug may also include various shapes and depressions to allow a user to adequately grip the plug during installation of the riser and/or threading of the plug into the circular mount of the saddle.

In a further embodiment a cap is disclosed having a female threading on the inside of a first (or outer) annular flange to connect to a male threaded tube of a saddle. The cap includes a center channel or tubular section. The tubular section can be threaded for connection to an irrigation riser or other sprinkler connection or it can be unthreaded to provide for a welded connection. A second (or inner) annular flange is provided and spaced inward of the first annular flange. In a preferred embodiment the second annular flange is a part of a shoulder in the tubular section onto which a riser is seated. The second annular flange includes a channel in its exterior surface that includes an O-ring. The o-ring functions as a dynamic seal in the channel preventing liquid leakage when the irrigation system is pressurized. The second annular flange and first annular flange are spaced apart to provide a receiving space into which the wall of the tube of the saddle is attached, but sufficiently close together such that the channel and o-ring can provide a seal between the second annular flange and the inner surface of the flange of the saddle.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments are to be regarded as illustrative in nature, and not as restrictive in nature.

DESCRIPTION OF THE PREFERRED EMBODIMENTS

FIG. 1 is an exploded view of a preferred embodiment of the saddle irrigation tee 10 with plastic adapter 20 defining a male mount 22 compatible with an irrigation accessory having female-type threading (not shown). The irrigation tee 10 has a first end 13 and a second end 15 to which may be attached irrigation pipe (not shown). FIG. 1 reveals the flange 12 of the irrigation tee, which is positioned around an aperture 11 in the wall of the irrigation tee 10. Also shown are the channels 14 of the irrigation tee and channel openings 16 through which may be inserted the flexible key (not shown) to join the irrigation tee 10 to an irrigation pipe. The plastic adapter (also called a plastic saddle) 20 is attached to the flange 12 using screws 30 as connectors. The plastic adapter 20 has a pipe side 22 and a mount side 24. The mount side 24 contains a male mount 22 with external threading 26. The male mount 22 defines a port 18 that is in fluid communication with the interior of the irrigation tee 10. FIG. 1 also shows the optional seal 19 positioned between the flange 12 and plastic adapter 20.

Figure 2:
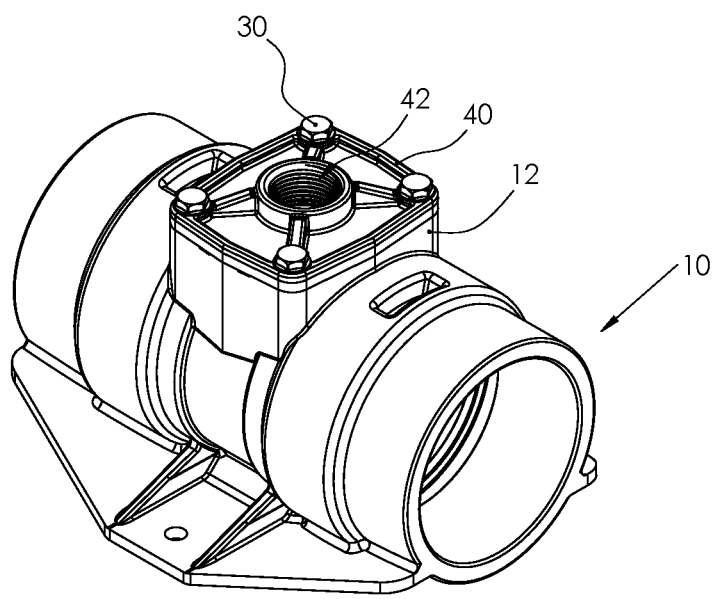

FIG. 2 is a perspective view of the irrigation tee 10 with an installed metal adapter 40 with a female mount 42. The female mount is attached to the flange 12 using screws 30.

Figure 3:
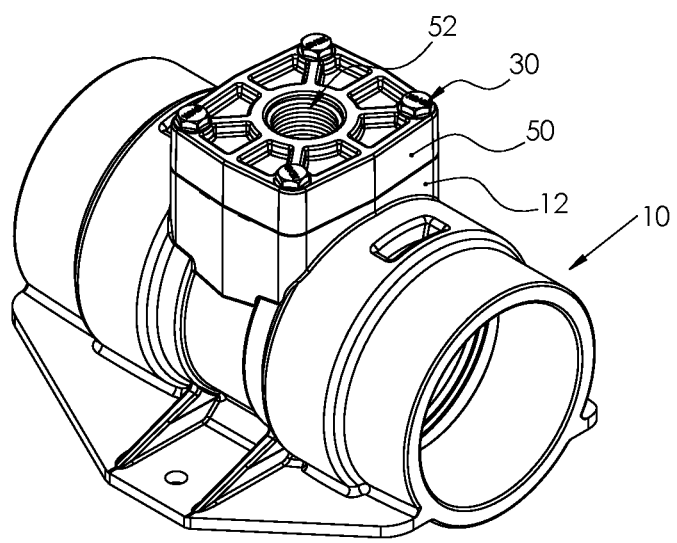

FIG. 3 is a perspective view of the irrigation tee 10 with an installed saddle 50 with a female mount 52. The plastic adapter 50 is attached to the flange 12 using screws 30.

Figure 4:
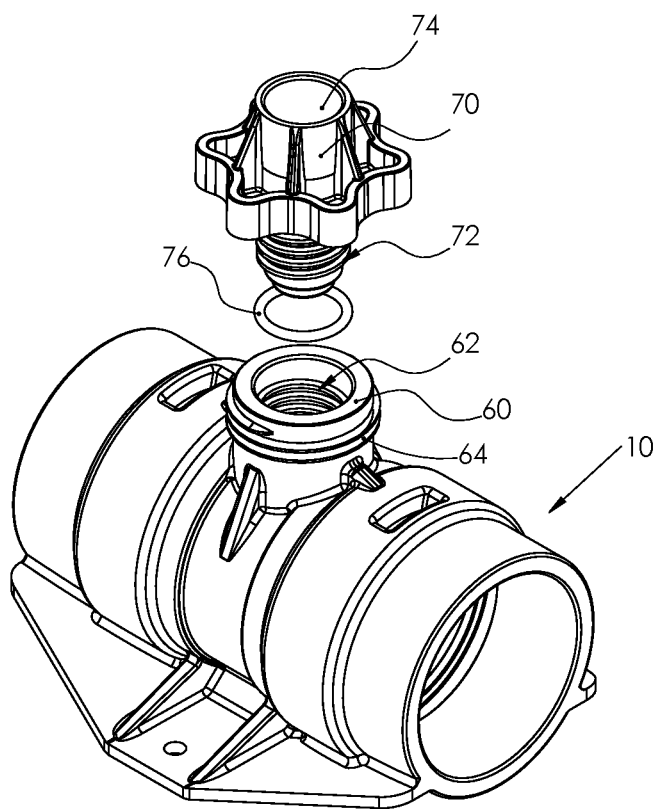

FIG. 4 is an exploded view of a irrigation tee 10 with an attached plug 70. The depicted saddle containing both internal threading 62 and external threading 64. The plug 70 with having external threading 72 on the bottom end (or second end) of the plug 70. The top end (or first end) of the plug 70 includes a smooth bore 74 to which may be secured an irrigation accessory, such as a riser (not shown). FIG. 4 also depicts the O-ring seal 78 positioned between the plug 70 and mount 60. In the preferred embodiment, this O-ring seal 78 is positioned within a dedicated channel 76 (illustrated in FIG. 5) located above the external threading on the lower portion of the plug.

Figure 5:
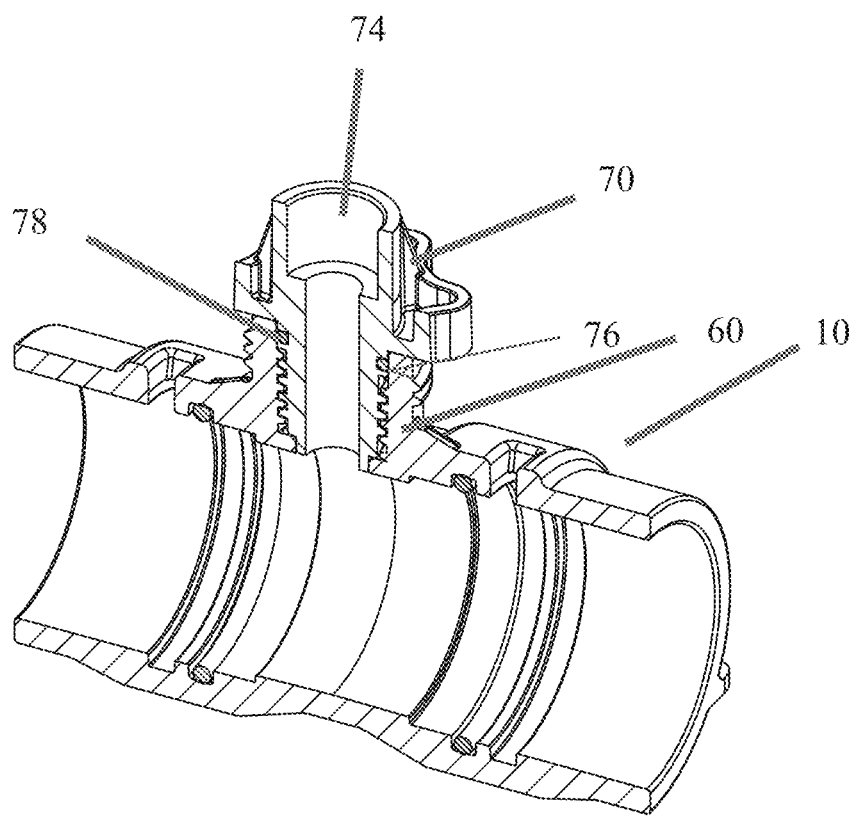

FIG. 5 is a cross section view of the irrigation tee 10 with an integrated mount saddle 60 with a plug 70 installed within the saddle 60 via complementary threading. FIG. 5 reveals the placement of the O-ring seal 76 within a dedicated channel 78 above the external threading on the bottom end of the plug 70. FIG. 5 also shows the smooth bore 74 of the top end of the plug 70.

Figure 6:
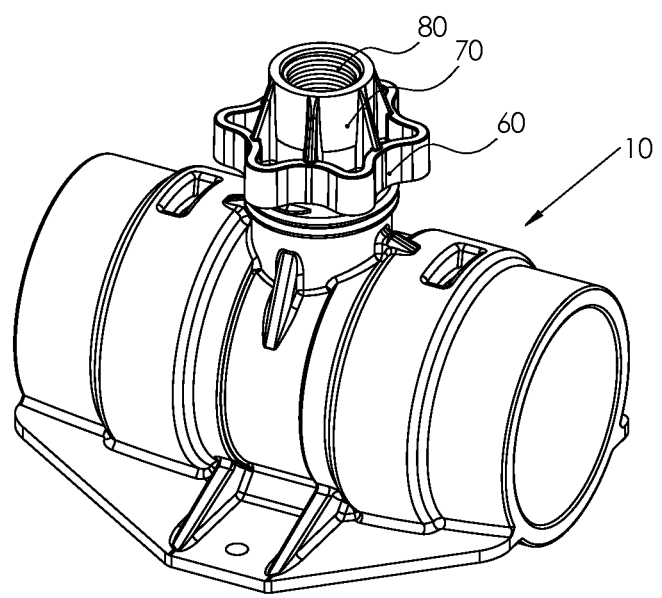

FIG. 6 is a perspective view of the irrigation tee 10 with an integrated mount 60 with a riser adapter in the form of a plug 70 installed within the mount 60 via complementary threading. The top end of the plug 70 of FIG. 6 includes female threading 80 for attachment of an irrigation accessory with male threading, such as a sprinkler riser.

Figure 7:
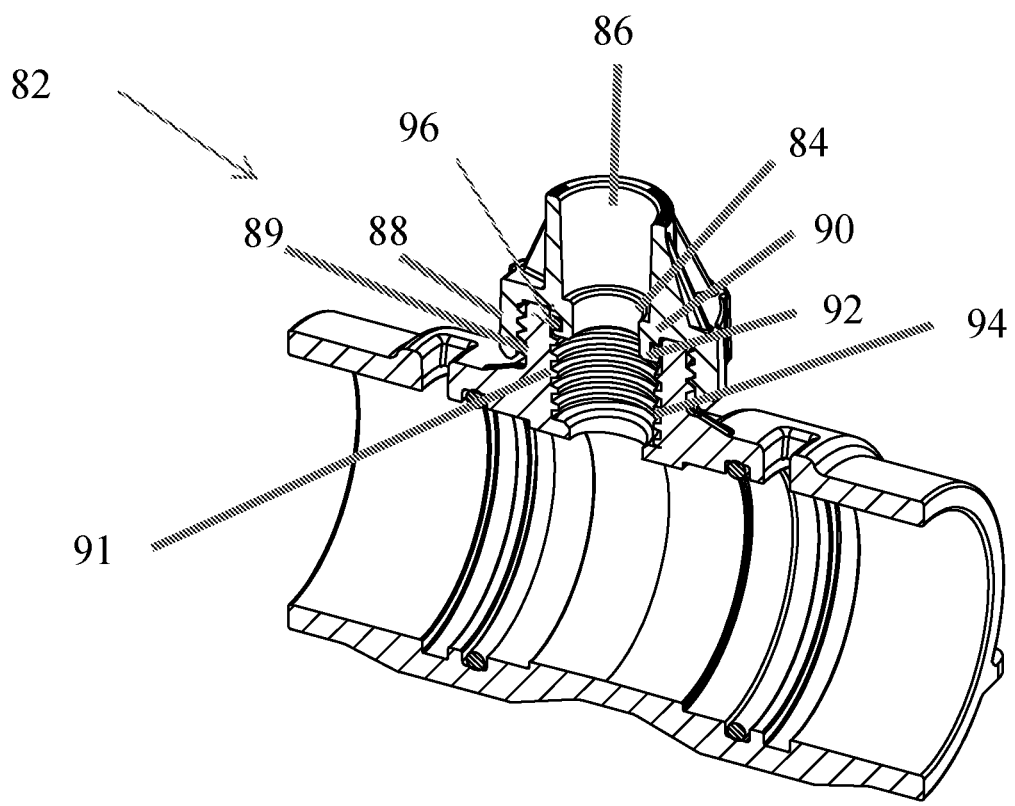

FIG. 7 illustrates an alternative embodiment of the preferred invention. FIG. 7 illustrates a riser adapter in the form of a cap and a saddle assembly 82. The cap is configured to attach to the saddle via external threads on the tube 89 of the saddle. Internal threads 94 are further illustrated for connecting the plug style adapter of FIGS. 4 through 6. The cap includes an inner channel 86 into which a riser or sprinkler tubing is placed. The inner channel can be threaded or smooth as illustrated. The inner channel includes a shoulder or seat 84 onto which a riser is seated when inserted into the channel 86. The shoulder extends downward as an inner annular flange 90 that extends downward when the cap is attached to a flange 91 of an irrigation connector or saddle. The shoulder includes a channel 96 in which an o-ring is positioned. The o-ring serves as a dynamic seal that prevents liquid from escaping around the inner annular flange 91 and between the shoulder and outer annular flange 88. The inner channel 86 provides a continuous channel for water flow to pass from the connector to an irrigation mechanism. The tube 91 of the saddle includes male and female threads in the depicted embodiment, but can be manufactured to lack threading at the depicted female threads. The male threads 89 of the saddle tube 91 are configured to made with the female threads of the first outer annular ring 88 of the riser adapter. The first annular ring, the inner channel, and the shoulder are generally coaxial rings.

While certain exemplary embodiments are shown in the Figures and described herein, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

We claim:
1. A riser adapter and saddle combination comprising:
An irrigation coupler being a tee comprising a cylindrical tube having at least one open end configured for connection to an irrigation pipe system, said irrigation coupler having a saddle positioned on a top of said irrigation coupler, said irrigation coupler having two opposing open ends configured to be in fluid connection to a fluid transport pipe, said saddle having a circular mount positioned above an aperture in the wall of said irrigation coupler, said aperture being in fluid communication with a central region of said saddle such that water may flow from the irrigation system into the connector and through the aperture, said mount comprising internal threading on the interior of the mount;
a riser adapter for connecting a sprinkler riser to the saddle, said riser adapter being a plug comprising a hollow main body that is cylindrical in shape, said hollow main body comprising a base having external circumferential threading threadingly engaged with the internal threading of the circular mount, wherein an exterior of said base comprising a dedicated circumferential channel on the exterior of the base such that said dedicated circumferential channel is positioned above said threads, said hollow main body comprising an upper portion having an interior configured for attachment thereto of a sprinkler riser;
a dynamic seal being an o-ring positioned within said circumferential channel, wherein said O-ring, said dedicated circumferential channel and an internal surface of said mount are configured such that water pressure from said irrigation system presses the O-ring into a seal preventing water from escaping to seal between said plug and said circular mount; and a sprinkler riser secured in said upper portion of said plug in fluid connection with said aperture and said tee.

2. The riser adapter and saddle combination of claim 1 wherein said upper portion of said plug comprises a smooth bore for attaching the sprinkler riser.

3. The riser adapter and saddle combination of claim 1 wherein said upper portion comprises threading for attachment of a sprinkler riser.

4. The riser adapter and saddle combination of claim 1 wherein said plug comprises an exterior shape configured to allow a user to grip the plug during installation.

* * * * *